United States Patent
Seo et al.

(10) Patent No.: US 7,879,477 B2
(45) Date of Patent: Feb. 1, 2011

(54) POLYMER BATTERY PACK

(75) Inventors: Kyungwon Seo, Suwon-si (KR); Seok Koh, Suwon-si (KR); Jeongdeok Byun, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 792 days.

(21) Appl. No.: 11/645,677

(22) Filed: Dec. 27, 2006

(65) Prior Publication Data

US 2007/0154785 A1 Jul. 5, 2007

(30) Foreign Application Priority Data

| Dec. 29, 2005 | (KR) | ...................... 10-2005-0134563 |
| May 24, 2006 | (KR) | ...................... 10-2006-0046745 |
| Aug. 7, 2006 | (KR) | ...................... 10-2006-0074394 |

(51) Int. Cl.
- H01M 2/34 (2006.01)
- H01M 2/06 (2006.01)
- H01M 2/02 (2006.01)

(52) U.S. Cl. .................. 429/61; 429/180; 429/181; 429/176

(58) Field of Classification Search .................. 429/61
See application file for complete search history.

(56) References Cited

U.S. PATENT DOCUMENTS

| 4,218,724 A | * | 8/1980 | Kaufman | ................... 361/736 |
| 6,258,480 B1 | | 7/2001 | Moriwaki et al. | |
| 7,262,956 B2 | | 8/2007 | Suzuki et al. | |
| 2003/0077486 A1 | * | 4/2003 | Iwaizono et al. | ................ 429/7 |
| 2004/0091769 A1 | * | 5/2004 | Kawabata et al. | ........... 429/163 |
| 2004/0251872 A1 | | 12/2004 | Wang et al. | |
| 2005/0208346 A1 | | 9/2005 | Moon et al. | |
| 2005/0221130 A1 | | 10/2005 | Yoon | |
| 2005/0233220 A1 | * | 10/2005 | Gozdz et al. | ........... 429/231.95 |
| 2006/0121344 A1 | | 6/2006 | Amagai et al. | |

FOREIGN PATENT DOCUMENTS

| CN | 2 631 052 Y | 8/2004 |
| EP | 0 613 204 A1 | 8/1994 |
| EP | 0 928 037 A1 | 7/1999 |
| JP | 2000-294202 | 10/2000 |
| JP | 2004-171964 A | 6/2004 |
| JP | 2005-166644 A | 6/2005 |
| JP | 2006-092884 | 4/2006 |
| JP | 2001-307703 A | 11/2007 |
| KR | U20-0406609 | 1/2006 |
| WO | WO 99/13520 | 3/1999 |
| WO | WO 2004/112182 A1 | 12/2004 |

* cited by examiner

*Primary Examiner*—Patrick Ryan
*Assistant Examiner*—Brent Thomas
(74) *Attorney, Agent, or Firm*—Lee & Morse, P.C.

(57) ABSTRACT

A polymer battery pack includes a polymer battery, an outer case having a first outer panel and a second outer panel, the outer case enclosing the polymer battery, an electrode tap in electrical communication with the polymer battery and positioned outside the outer case, and a protecting circuit board in electrical communication with the electrode tap and positioned outside the outer case, for enhanced operation and durability.

39 Claims, 10 Drawing Sheets

POLYMER BATTERY PACK

BACKGROUND OF THE INVENTION

1. Field of the Invention

The present invention relates to a polymer battery pack. In particular, the present invention relates to a polymer battery pack having improved strength, safety and reliability.

2. Description of the Related Art

Polymer batteries may be widely used in various electric devices, such as cellular phones, laptop computers, videotape recorders with a built-in camera, and so forth.

In general, a conventional polymer battery pack of a polymer battery may include a protection circuit element connected to a bare cell having a pouch form and a plastic case enveloped by a supersonic wave melt to enclose the bare cell.

The conventional bare cell may include an electrode assembly of a cathode electrode/separator/anode electrode and an electrolysis liquid, e.g., polymer or liquid phase, encased in a pouch formed of a modified copolymer of propylene (CPP)/aluminum/nylon or of polyethylene terephthalate (PET).

However, the conventional bare cell of a pouch form may not be sufficiently strong and be easily damaged by external impacts, such as bending, twisting, dropping, piercing, and so forth. Similarly, the conventional plastic case may be substantially thin and prone to deformation as well. As such, the conventional polymer battery pack may be easily damaged and, thereby, trigger unreliable electrical operation of the polymer battery therein.

Accordingly, there exists a need to improve the structure of the polymer battery pack to provide for an enhanced operation and durability of the polymer battery therein.

SUMMARY OF THE INVENTION

The present invention is therefore directed to a polymer battery pack which substantially overcomes one or more of the disadvantages of the related art.

It is therefore a feature of an embodiment of the present invention to provide a polymer battery pack having improved strength and durability with respect to external impacts.

At least one of the above and other features and advantages of the present invention may be realized by providing a polymer battery pack, including a polymer battery, an outer case having a first outer panel and a second outer panel, the outer case enclosing the polymer battery, an electrode tap in electrical communication with the polymer battery and positioned outside the outer case, and a protecting circuit board in electrical communication with the electrode tap and positioned outside the outer case. The first and second outer panels may be parallel to one another, and the polymer battery may be placed therebetween.

The outer case may include a rear connecting plate in communication with the first and second outer panels. The rear connecting plate may be capable of bending to a predetermined angle.

The first outer panel may include an upper portion coupled to an upper-peripheral portion, and the second outer panel may include a lower portion coupled to a lower-peripheral portion. The upper-peripheral portion may include an upper horizontal surface and an upper perpendicular surface, the upper horizontal surface positioned lower with respect to the upper portion, and the lower-peripheral portion may include a first lower horizontal surface, a second lower horizontal surface, a first lower perpendicular surface, and a second lower perpendicular surface, and the second lower horizontal surface of the second outer panel may be coupled to the upper perpendicular surface of the first outer panel.

The upper perpendicular surface of the first outer panel may be positioned on a same plane as the first lower perpendicular surface of the second outer panel. The upper-peripheral and lower-peripheral portions may be coupled to each peripheral side of the upper and lower portions, respectively. Alternatively, the upper-peripheral and lower-peripheral portions may be coupled to each peripheral side and a rear side of the upper and lower portions, respectively.

The first outer panel may further include a curved surface and a front perpendicular surface connected to the curved surface, and the second outer panel may include a front horizontal surface. Additionally, the outer case may include steel, stainless steel, aluminum, copper, metal alloy or plastic resin.

The polymer battery pack may further include a plurality of upper and lower locking holes formed through the first and second outer panels, respectively. The plurality of upper and lower locking holes may be in communication with the electrode pad.

The protection circuit may be positioned in parallel to the upper and lower locking holes. The protection circuit board may include at least one electrode lead coupled to the electrode tap. Further, the protection circuit board may include an insulating member between the at least one electrode lead and the electrode tap.

The battery pack may further include a molding resin. The molding resin may include at least one opening in communication with the outer case, a plurality of holes, and a damping paper in communication with the plurality of holes. The at least one opening of the molding resin may be electrically connected to an electrode terminal of the protection circuit board.

The polymer battery pack may also include two parallel covers, each cover coupled to the outer case. Each cover may be coupled to the upper horizontal surface of the first outer panel and to the first lower horizontal surface of the second outer panel via a perpendicular body. Additionally, each cover further may include an upper longitudinal member coupled to the upper horizontal surface of the first outer panel and a lower longitudinal member coupled to the first lower horizontal surface of the second outer panel. The upper longitudinal member may be positioned on a same plane as the upper portion of the first outer panel, and the lower longitudinal member may be positioned on a same plane as the lower portion of the second outer panel.

The polymer battery may additionally include an insulator between the electrode tap and the outer case. The insulator may be in communication with the protection circuit board via the molding resin.

The polymer battery pack may include a label on a surface of the outer case. The label may be in communication with the first outer panel and the second outer panel.

The polymer battery may include a pouch, an insulator layer having a metal foil, an electrolysis liquid, and an electrode assembly in communication with the electrode tap.

The polymer battery pack may also include an insulating surface in contact with the upper portion, the lower portion, and at least one side surface of the outer case. The insulating surface may be an adhesive surface. Similarly, the polymer battery pack may include an insulator member between each cover and the outer case. The insulator member may be an adhesive tape.

In another aspect of the present invention, there is provided a polymer battery pack, including a polymer battery, an outer case having a first outer panel and a second outer panel, the outer case enclosing the polymer battery, an electrode tap in electrical communication with the polymer battery and positioned outside the outer case, a protection circuit board in electrical communication with the electrode tap and positioned outside the outer case, and a molding resin surrounding the outer case.

The polymer battery pack may include a plurality of upper and lower locking holes through the outer case. Alternatively, the polymer battery pack may include at least one upper locking hole through the first outer panel. In yet another alternative, the polymer battery pack may include at least one lower locking hole through the second outer panel. The polymer battery pack may also include at least one central locking hole through a boundary between the first and second outer panels. The lower and upper locking holes may correspond to one another to form elliptical shapes. The outer case may have an open tube shape.

DETAILED DESCRIPTION OF PREFERRED EMBODIMENTS

Figure 1:
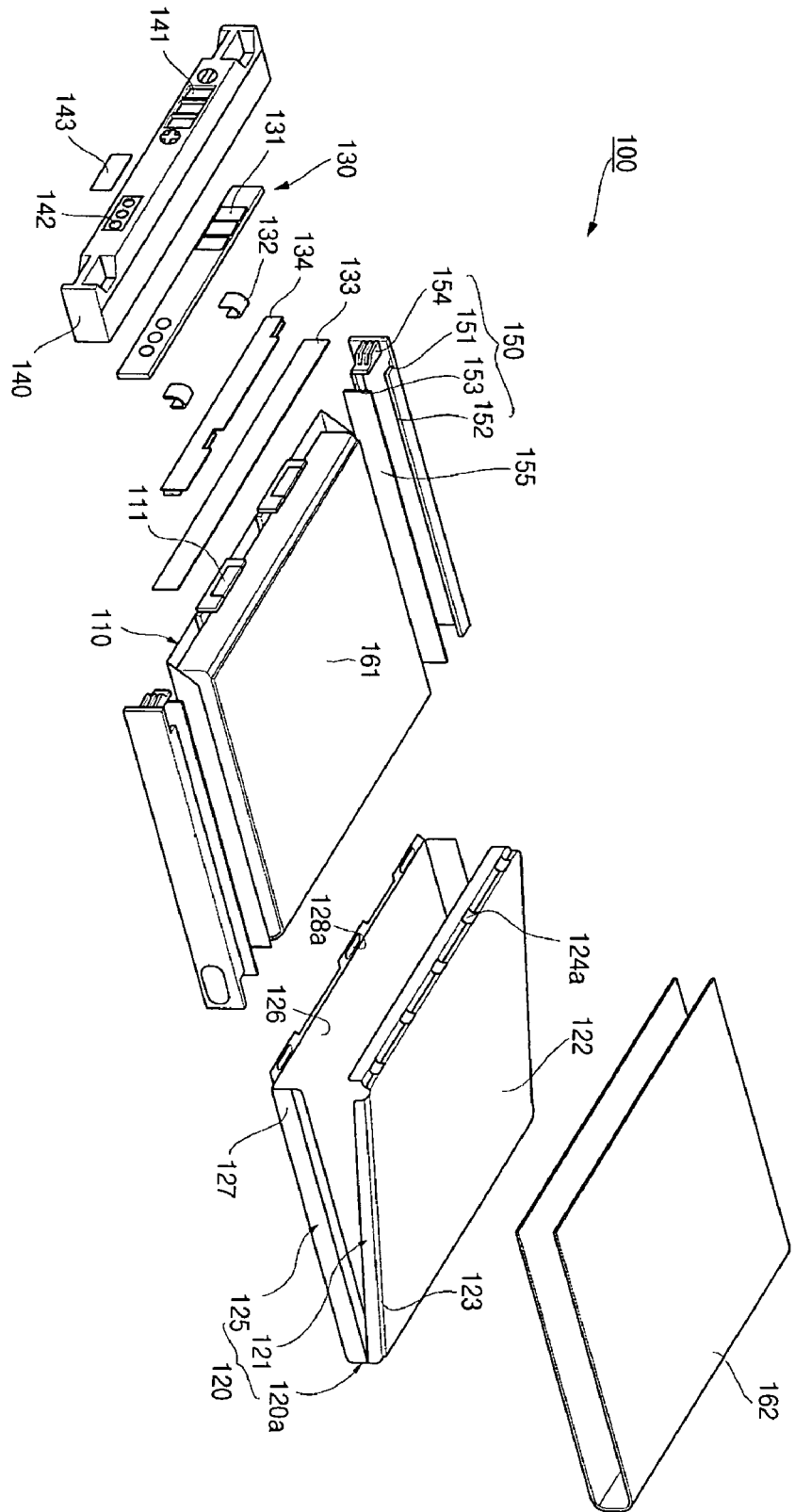
FIG. 1 illustrates an exploded perspective view of a polymer battery pack according to an embodiment of the present invention.

Korean Patent Application No. 10-2006-0074394, filed on Aug. 7, 2006, No. 10-2006-0046745, filed on May 24, 2006, and No. 10-2005-0134563, filed on Dec. 29, 2005, in the Korean Intellectual Property Office, all entitled: "Polymer Battery Pack," are incorporated by reference herein in their entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

It will further be understood that when an element is referred to as being "on" another element or substrate, it can be directly on the other element or substrate, or intervening elements may also be present. Further, it will be understood that when an element is referred to as being "under" another element, it can be directly under, or one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
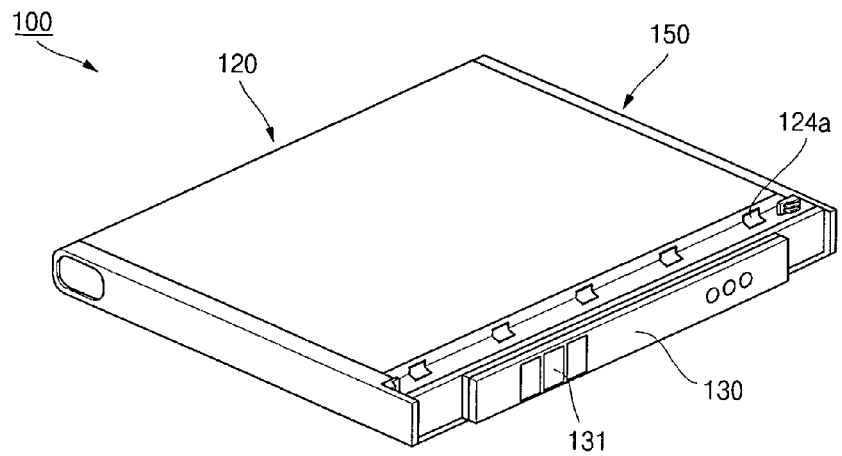
FIG. 2 illustrates a schematic perspective view of an assembled polymer battery pack illustrated in FIG. 1.
Figure 3:
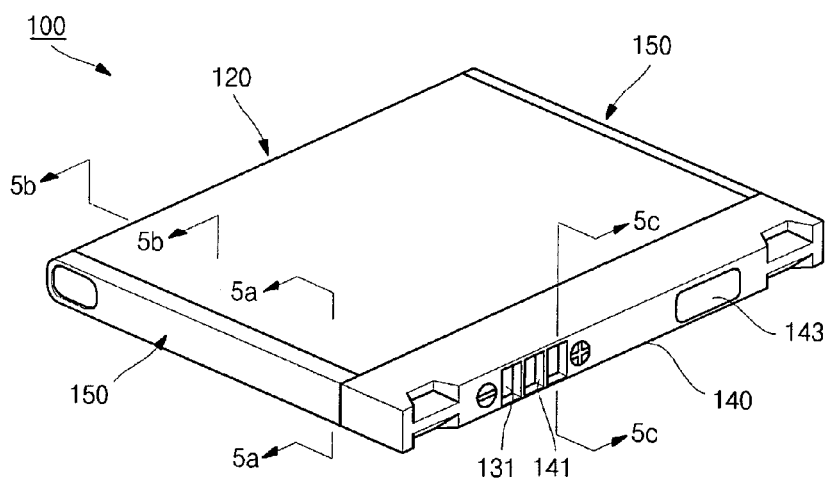
FIG. 3 illustrates a schematic perspective view of an assembled and molded polymer battery pack illustrated in FIG. 1.

An exemplary embodiment of a polymer battery pack according to the present invention is more fully described below with reference to FIGS. 1-5. As illustrated in FIGS. 1-3, a polymer battery pack 100 according to an embodiment of the present invention may include a polymer battery 110, an outer case 120, two covers 150 connected symmetrically to the outer case 120, a protection circuit 130, and a molding resin 140.

The polymer battery 110 may be a rechargeable lithium polymer battery with an electrolysis liquid, e.g., polymer or liquid phase electrolysis, formed in a hexagonal form. Additionally, the polymer battery 110 may include an electrode tap 111 having a predetermined length and formed in communication with a front side of the polymer battery 110. Accordingly, the polymer battery 110 may be charged and discharged through the electrode tap 111. A more detailed description of the polymer battery 110 will be provided with respect to FIG. 5B.

The outer case 120 of the polymer battery pack 100 may be formed of steel, stainless steel, aluminum, copper, metal alloy, plastic (engineering plastic), or any like material in a flattened hexagonal shape. Further, the outer case 120 may include a first outer panel 121, a second outer panel 125, and a rear connecting plate 120a.

The first outer panel 121 may include an upper portion 122 and an upper-peripheral portion 123, such that the upper-peripheral portion 123 may be coupled perpendicularly along sides of the upper portion 122 to form a casing, i.e., the first outer panel 121, for covering an upper surface of the polymer battery 110. Additionally, the first outer panel 121 may include a plurality of upper locking holes 124a. The plurality of upper locking holes 124a may be formed through a front side of the first outer panel 121, as illustrated in FIG. 1, such that upon placement of the polymer battery 110 into the outer case 120, the location of the plurality of locking holes 124a may correspond to a location of an electrode tap 111 of the polymer battery 110.

The second outer panel 125 of the outer case 120 may include a lower portion 126 and a lower-peripheral portion 127, such that the lower-peripheral portion 127 may be coupled perpendicularly along sides of the lower portion 126 to form a casing, i.e., the second outer panel 125, for covering a lower surface of the polymer battery 110. Additionally, the second outer panel 125 may include a plurality of lower locking holes 128a. The plurality of lower locking holes 128a may be formed through a front side of the second outer panel 125, as illustrated in FIG. 1, such that upon placement of the polymer battery 110 into the outer case 120, the location of the plurality of lower locking holes 128a may correspond to the location of the electrode tap 111 of the polymer battery 110 and the upper locking holes 124a.

The rear connecting plate 120a of the outer case 120 may be perpendicular to the first and second outer panels 121 and 125 and function as a connecting element therebetween. Accordingly, a connection between the rear connecting plate 120a and the first and second outer panels 121 and 125 may form a volumetric shape capable of storing a polymer battery therein, i.e., the outer case 120. It should be noted that upon coupling of the first and second outer panels 121 and 125, the upper-peripheral and lower-peripheral portions 123 and 127 may be coupled to one another as will be described in more detail with respect to FIG. 5A. Further, the rear connecting plate 120a may be capable of bending, e.g., upon opening of the outer case 120, to a predetermined bending degree, e.g., parallel to the first and second outer panels 121 and 125. In other words, the rear connecting plate 120a may be capable of bending backwards upon opening of the upper portion 122 of the outer case 120 to form an inverted "L" shape. The rear connecting plate 120a may be formed of any material or any shape as determined by one of ordinary skill in the art with respect to type of polymer battery or design of the battery pack.

Without intending to be bound by theory, it is believed that by forming the outer case 120 from the materials listed above and by connecting the first and second outer panels 121 and 125 via the rear connecting plate 120a, the polymer battery pack exhibits sufficient strength and minimized corrosion to substantially overcome one or more disadvantages of the related art.

The covers 150 of the polymer battery pack 100 according to an embodiment of the present invention may be coupled in parallel to each side of the outer case 120. In other words, each cover 150 may be attached to a peripheral side of the outer case 120 and extend to a predetermined length. In this respect it should be noted that a "peripheral side" of the outer case 120 or its upper or lower portions 121 and 125 may refer to side edges that are positioned in parallel to the covers 150 and perpendicularly to the molding resin 140 and protection circuit board 130, as illustrated in FIG. 1. On the other hand, a "rear side" of the outer case 120 may refer to a back side of the case 120 positioned in parallel to the molding resin 140 and opposite thereto. Without intending to be bound by theory, it is believed that an attachment between the covers 150 and the outer case 120, i.e., first outer panel 121 and the second outer panel 125, may further improve the sturdiness of the polymer battery pack 100.

Each cover 150 may be formed of a plastic resin, metal, or any other suitable material as determined by one of ordinary skill, and include an insulator member 155 located on an inner surface thereof, such that upon connection between the cover 150 and the outer case 120, the insulator may be adhered, e.g., via an adhesive tape, therebetween. Each cover 150 may additionally include a plurality of protrusions 154, a perpendicular body 151, an upper longitudinal member 152, and a lower longitudinal member 153. The plurality of protrusions 154 may be formed on a front of each cover 150. The upper and lower longitudinal members 152 and 153 may be positioned to facilitate attachment between each cover 150 and the first and second outer panels 121 and 125, as will be discussed further with respect to FIG. 5A.

The molding resin 140 of the polymer battery pack 100 according to an embodiment of the present invention may be formed, for example, by a transfer molding process from a hot melt resin or an equivalent thereof. The molding resin 140 may be positioned in a front of the outer case 120 between the covers 150 and perpendicularly thereto, such that the molding resin 140 may be in communication with the outer case 120 and the covers 150, as illustrated in FIG. 1. In particular, the molding resin 140 may be coupled to the outer case 120 via the upper and lower locking holes 124a and 128a, such that the polymer battery 110 may be shielded from the exterior. Without intending to be bound by theory, it is believed that such a connection between the molding resin 140 and the outer case 120 may provide sufficient overall durability to the polymer battery pack 100 and minimize damage thereto upon external impacts from bending, twisting, dropping, and so forth.

Additionally, as illustrated in FIG. 1, the resin molding 140 may include a plurality of openings 141, a plurality of holes 142, and a damping paper 143. The openings 141 may be positioned to correspond to the electrode terminals 131 of the protection circuit board 130, such that the electrode terminals 131 may have an exterior connection therethrough. The damping paper 143 may provide a moisture detection function inside the polymer battery pack 100, i.e., around the protection circuit board 130, via the plurality of holes 142. Accordingly, the plurality of holes 142 may be in communication with the protection circuit board 130, while the damping paper 143 may be attached to a cover the plurality of hole 142 on a front surface of the resin molding 140.

Accordingly, the polymer battery 110 may be enclosed inside the outer case 120, while the two covers 150 and the molding resin 140 may be attached to surround a perimeter of the outer case 120, as illustrated in FIG. 1. Without intending to be bound by theory, it is believed that employing the molding resin 140 and the symmetrical attachment of the covers 150 to the outer case 120 may improve overall strength and stability of the polymer battery pack 100.

In this respect, it should be noted that the polymer battery 110 may be enclosed by the outer case 120, while the electrode tap 111 of polymer battery 110 may be positioned on an outer side of the outer case 120 to facilitate electrical connection between the polymer battery 110 and the protection circuit board 130.

The protection circuit board 130 may be electrically connected to the electrode tap 111 of the polymer battery 110 and be positioned between the molding resin 140 and the polymer battery 110, i.e., outside the outer case 120. The protection circuit board 130 may be connected to the polymer battery 110 via at least one electrode lead 132. The electrode lead 132 may be shaped as an inverted U, i.e., ∩-shape. An insulating strip 133 and an insulating member 134 may be mounted between the electrode tap 111 and the protection circuit board 130 to minimize a potential short therebetween. The protection circuit board 130 may also include at least one electrode terminal 131 at its front to provide sufficient electrical connection to an outer set (not shown) through the opening 141 of the molding resin 140. All the electrical components connected to the protection circuit board 130, i.e., electrode lead 132, electrode tap 111 and the electrical connections therebetween, may be shielded from the exterior by the resin molding 140. Further, the protection circuit board 130 or the resin molding 140 can not be easily separated from the outer case 120.

The polymer battery pack 100 according to an embodiment of the present invention may also include an insulating surface 161. The insulating surface 161 may be deposited to cover an upper surface, a rear surface and a lower surface of the polymer battery, such that the insulating surface 161 may be positioned between the outer case 120 and the polymer battery 110 to prevent an electrical short. The insulating surface 161 may be formed of any material as determined by one of ordinary skill it the art, and it may be applied via any convenient adhesive, e.g., a surface adhesive tape. Accordingly, the adhesive properties of the insulating surface 161 may impart additional strength to a connection between the outer case 120 and the polymer battery 110. Further, a coupling power may be improved by the adhesive insulating surface 161.

The polymer battery pack 100 according to an embodiment of the present invention may also include a label 162. The label 162 may be adhered to an outer surface of the outer case 120, i.e., in communication with outer surfaces of the first outer panel 121, the rear connecting plate 120a, and the second outer panel 125. The label 162 may supply a space for providing manufacturing information.

Figure 4A:
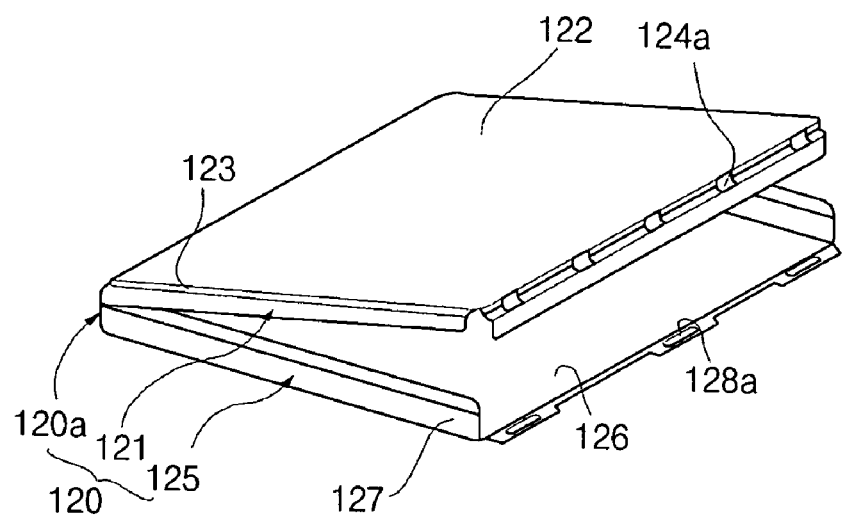
FIG. 4A illustrates a perspective view of an open outer case of the polymer battery pack illustrated in FIG. 1.
Figure 4B:
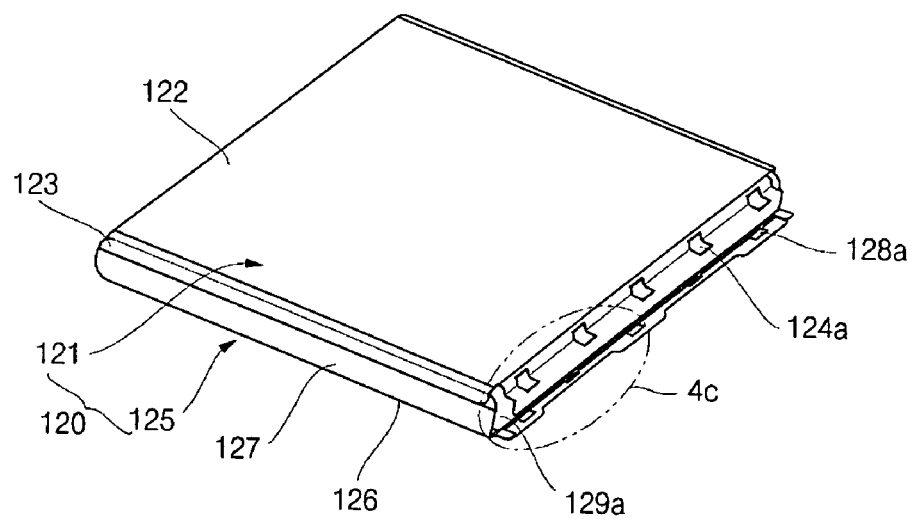
FIG. 4B illustrates a perspective view of a closed outer case of the polymer battery pack illustrated in FIG. 1.
Figure 4C:
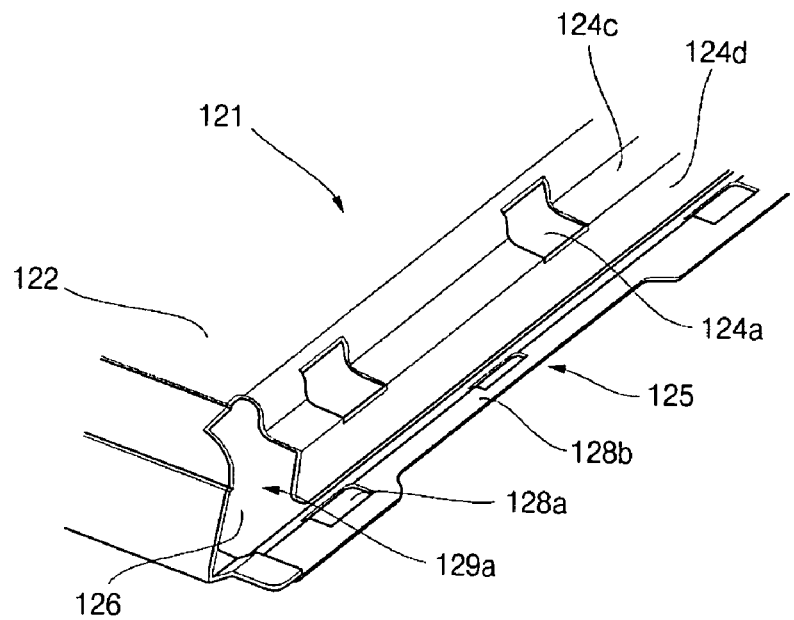
FIG. 4C illustrates an enlarged perspective view of region 4c illustrated in FIG. 4B.

More details regarding the structure of the elements of the battery pack 100 according to an embodiment of the present invention may be provided with respect to FIGS. 4-5. In particular, the outer case 120 may be formed as a hollow hexagonal casing capable of providing storage space therein. More specifically, as illustrated in FIGS. 4A-4B, the first outer panel 121 may operate as an upper cover capable of moving upward to expose an interior space of the outer case 120 for placing the polymer battery 110. The outer case 120 may further include, as illustrated in FIG. 4C, an opening 129a formed in a front panel thereof to facilitate electrical connection of the polymer battery 110, a curved surface 124c, a front perpendicular surface 124d, and a front horizontal surface 128b. The curved surface 124c and front perpendicular surface 124d may be positioned in perpendicular planes and connected to one another. The curved surface 124c may be connected along its longitudinal side to the upper portion 122 of the first outer panel 121. The front horizontal surface 128b may be formed on the front of the second outer panel 125 of the outer case 120. Accordingly, the plurality of upper locking holes 124a may be formed through the curved surface 124c and the front perpendicular surface 124d, and the lower locking holes 128a may be formed through the front horizontal surface 124b. The upper and lower locking holes 124a and 128a may correspond to one another when the outer case 120 is closed and be coupled with resin to enhance strength and durability of the outer case 120.

In this respect, it should be noted that the front perpendicular surface 124d and the front horizontal surface 128b may not be coupled to one another, thereby facilitating formation of the opening 129a therebetween at a predetermined size. Accordingly, the electrode tap 111 and the polymer battery 110 may be connected via the opening 129a.

Figure 5A:
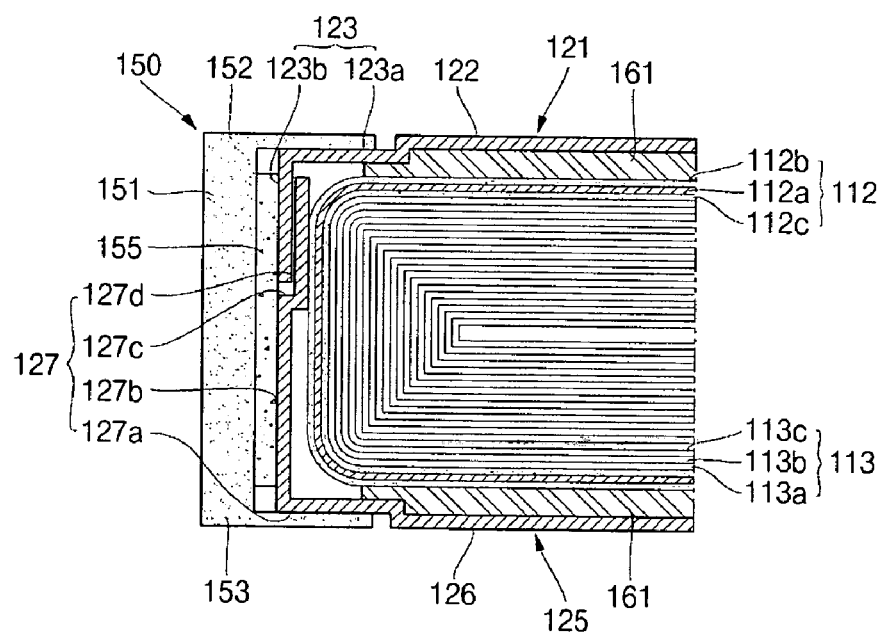
FIG. 5A illustrates a sectional view along line 5a-5a of FIG. 3.

As illustrated in FIG. 5A, the upper-peripheral portion 123 of the first outer panel 121 may include an upper horizontal surface 123a and an upper perpendicular surface 123b. The upper perpendicular surface 123b may connect to the upper horizontal surface 123a and be positioned in a downward direction and at a right angle with respect to the upper horizontal surface 123a. The upper horizontal surface 123a may be coupled parallel to an inner surface of the upper portion 122, as illustrated in FIG. 5A, such that the upper horizontal surface 123a may be positioned lower than the upper portion 122 with respect to a vertical direction.

Similarly, the lower-peripheral portion 127 of the second outer panel 125 may include a lower first horizontal surface 127a, a lower first perpendicular surface 127b, a lower second horizontal surface 127c, and a lower second perpendicular surface 127d, sequentially connected to one another. In particular, the lower first horizontal surface 127a may be coupled parallel to an inner surface of the lower portion 126, as illustrated in FIG. 5A, such that the first lower horizontal surface 127a may be positioned higher than the lower portion 126 with respect to a vertical direction. The first lower perpendicular surface 127b may connect to the first lower horizontal surface 127a and be positioned in an upward direction and at a right angle with respect to the first lower horizontal surface 127a. The second lower horizontal surface 127c may be coupled to the first lower perpendicular surface 127b and in parallel to the first lower horizontal surface 127a, as illustrated in FIG. 5A. The second lower perpendicular surface 127d may be positioned in an upward direction and at a right angle with respect to the second lower horizontal surface 127c.

The second lower perpendicular surface 127d may be coupled to an inner surface of the upper perpendicular surface 123b of the first outer panel 121. The upper perpendicular surface 123b of the first outer panel 121 and the first lower perpendicular surface 127b of the second outer panel 125 may be positioned on a same plane, thereby forming an almost continuous sidewall of the outer case 120.

As further illustrated in FIG. 5A, the cover 150 may be coupled to the upper horizontal surface 123a of the first outer panel 121 and the first lower horizontal surface 127a of the second outer panel 125 via the upper longitudinal member 152 and the lower longitudinal member 153. Further, the upper longitudinal member 152 of the cover 150 and the upper portion 122 of the first outer panel 121 may be positioned on a same plane, thereby forming an almost continuous sidewall of the outer case 120. Similarly, the lower longitudinal member 153 of the cover 150 and the lower portion 126 of the second outer panel 125 may be positioned on a same plane, thereby forming an almost continuous sidewall of the outer case 120. In this respect, it should be noted that "almost continuous" refers to a wall having an uninterrupted surface with an exception of one potential opening therein.

The perpendicular body 151 of the cover 150 may be attached to the upper perpendicular surface 123b of the first outer panel 121 and the first lower perpendicular surface 127b of the second outer panel 125 via the insulator member 155.

Figure 5B:
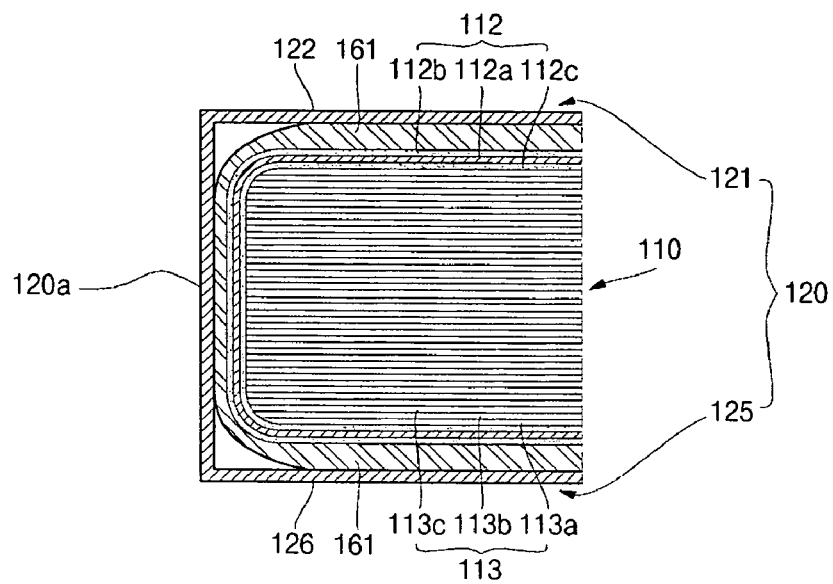
FIG. 5B illustrates a sectional view along line 5b-5b of FIG. 3.

As illustrated in FIG. 5B, the polymer battery 110 may include a pouch 112, an electrode assembly 113 and an electrolysis liquid (not shown). The pouch 112 may include a metal foil 112a between a first insulating layer 112b and a second insulating layer 112c. The metal foil 112a may be formed of aluminum, stainless steel, or a like metal. The first insulating layer 112b may be formed on an upper portion of the metal foil 112a of nylon, polyethylene terephthalate (PET), or a like material. The second insulating layer 112c may be formed on a lower portion of the metal foil 112a of a modified polypropylene (CPP) or like materials.

The electrode assembly 113 of the polymer battery 110 may include an anode electrode plate 113a, a separator 113b, and a cathode electrode plate 113c. The anode electrode plate 113a may include an aluminum core coated with anode active materials, e.g., lithium metal oxides. The cathode electrode plate 113c may include a copper core coated with cathode active materials, e.g., carbon. The separator 113b may be formed of a porous material, e.g., polypropylene (PP), polyethylene (PE), and so forth, to facilitate lithium ion mobility between the anode electrode plate 113a and the cathode electrode plate 113c.

The insulating surface 161 may be formed at any thickness as determined by one of ordinary skill in the art and may be adhered on an inner surface of the outer case 120, such that the insulating surface 161 may be positioned between the pouch 112 and each of the inner surfaces of the outer case 120, i.e., the upper portion 122, the lower portion 126, and the rear connecting plate 120a. Accordingly, incorporation of the insulating surface 161 may improve the stability and durability of the pouch 112 and the outer case 120.

Figure 5C:
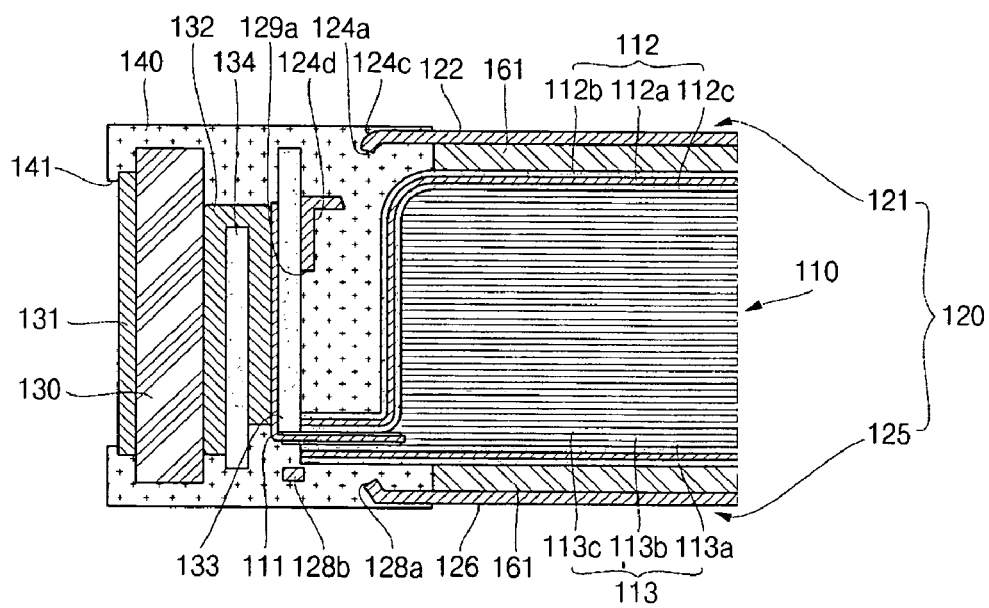
FIG. 5C illustrates a sectional view along line 5c-5c of FIG. 3.

As illustrated in FIG. 5C, the protection circuit board 130 can be connected to the electrode tap 111 of the polymer battery 110 via the electrode lead 132.

The molding resin 140 may be filled through the upper and lower locking holes 124a and 128a to improve strength and durability between the resin 140 and the outer case 120. In particular, the molding resin 140 may penetrate into the interior of the outer case 120 through the opening 129a during the molding procedure and, subsequently, couple to a predetermined region of the pouch 112.

Figure 6A:
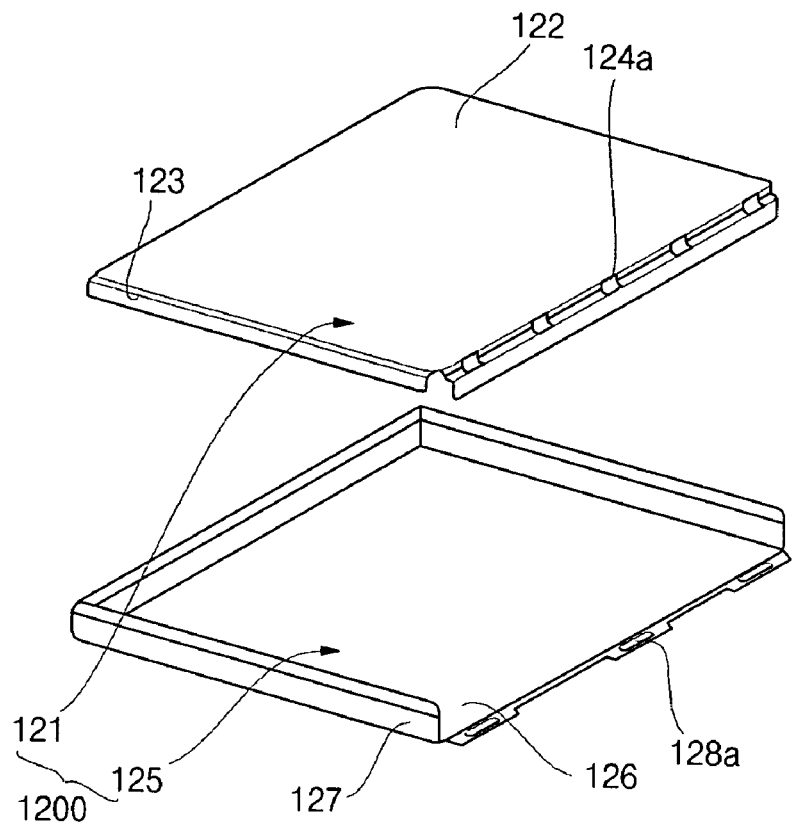
FIG. 6A illustrates an exploded perspective view of another embodiment of an outer case of a polymer battery pack according to the present invention.
Figure 6B:
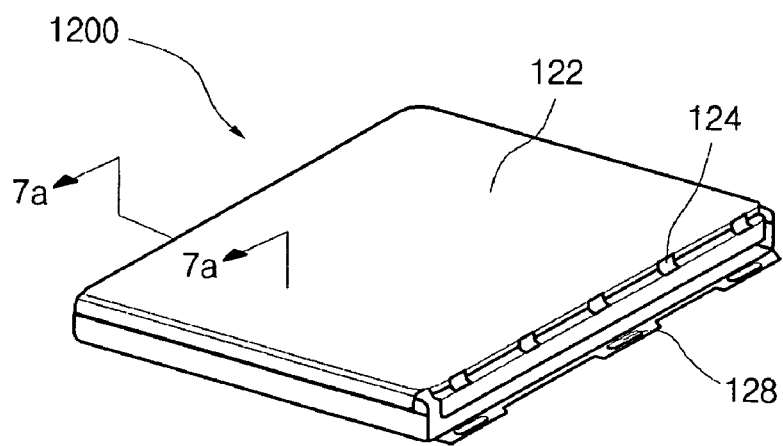
FIG. 6B illustrates a perspective view of a closed outer case illustrated in FIG. 6A.
Figure 7:
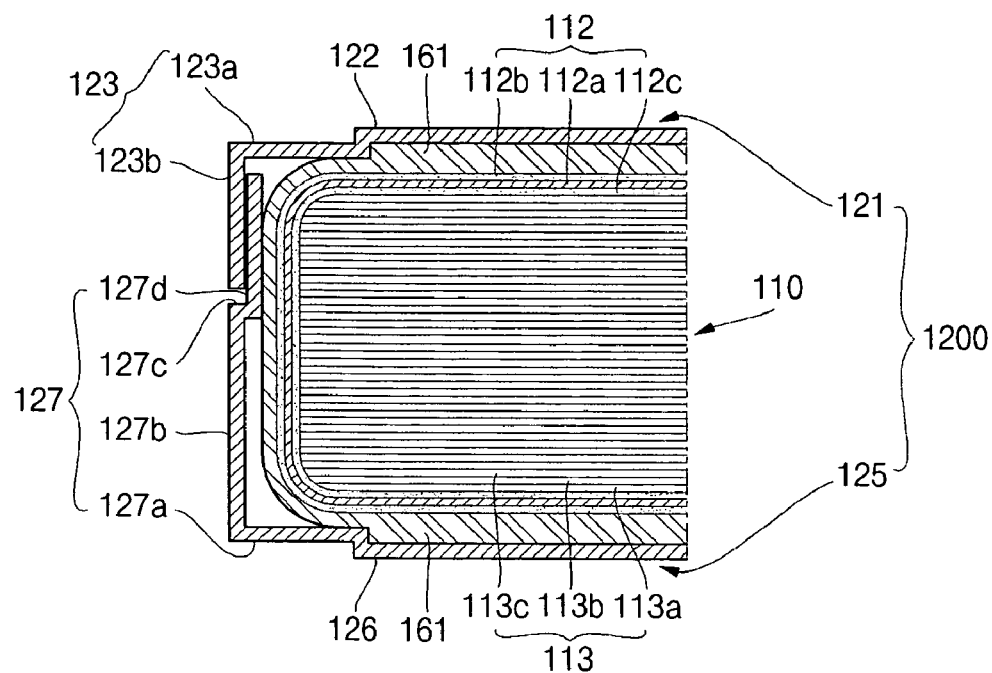
FIG. 7 illustrates a sectional view along line 7a-7a of FIG. 6B.

According to another exemplary embodiment of the present invention, a polymer battery pack may include an outer case 1200 as opposed to the outer case 120, as illustrated in FIGS. 6-7. The outer case 1200 may be similar to the outer case 120 described previously with respect to FIGS. 1-5 with the exception that the upper-peripheral portion 123 of the first outer panel 121 and the lower-peripheral portion 127 of the second outer panel 125 may be coupled along both side edges and back portion of the upper and lower portions 122 and 126, respectively. In other words, as illustrated in FIGS. 6A-6B, the rear connecting plate 120a of the outer case 120 may be replaced in the outer case 1200 with a coupled structure of the upper and lower-peripheral portions 123 and 127.

More specifically, as illustrated in FIG. 7, coupling of the upper-peripheral portion 123 of the first outer panel 121 and the lower-peripheral portion 127 of the second outer panel 125 in a rear side of the outer case 1200 may resemble the coupling of the upper-peripheral portion 123 of the first outer panel 121 and the lower-peripheral portion 127 of the second outer panel 125 in the sides of the outer case 120 described previously with respect to FIG. 5A and, therefore, will not be repeated herein.

Figure 8:
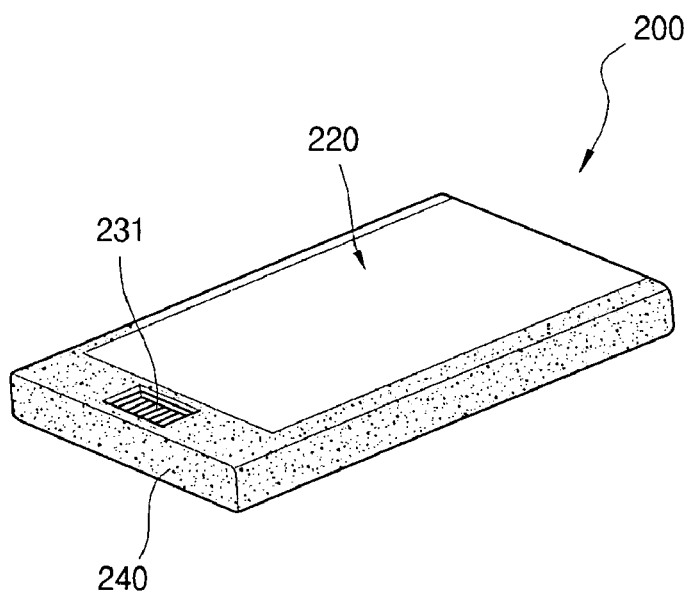
FIG. 8 illustrates a perspective view of a polymer battery pack according to another embodiment of the present invention.
Figure 9:
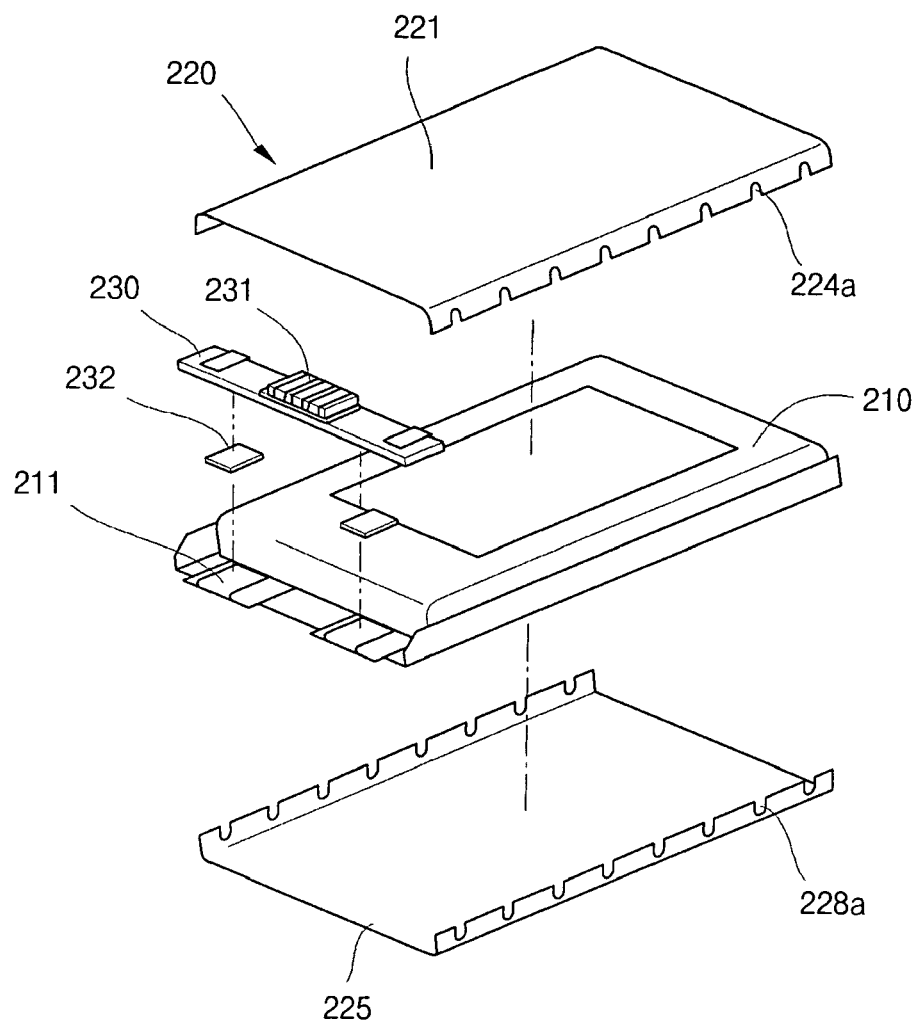
FIG. 9 illustrates an exploded perspective view of the polymer battery pack illustrated in FIG. 8.

According to yet another exemplary embodiment of the present invention illustrated in FIGS. 8-9, a polymer battery pack 200 may include an outer case 220, electrode terminals 231, and a molding resin 240. The polymer battery pack 200 may enclose a polymer battery 210 connected to an electrode tap 211. The electrode tap 211, however, maybe in communication with the exterior and not enclosed within the polymer battery pack 200.

The outer case 220 may be formed of steel, stainless steel, aluminum, copper, metal alloy, plastic (engineering plastic), or any like material in a flattened hexagonal shape. Further, the outer case 220 may include a first outer panel 221 and a second outer panel 225. Upon assembly, only an outer surface of the first outer panel 221 and an outer surface of the second outer panel 225 may be in contact with the exterior, as illustrated in FIG. 8.

A plurality of upper and lower locking holes 224a and 228a may be formed through the first and second outer panels 221 and 225, respectively. Accordingly, upon coupling of the first and second outer panels 221 and 225, the plurality of upper and lower locking holes 224a and 228a may correspond to one another and combine to form elliptical shapes.

The molding resin 240 of the polymer battery pack 200 according to an embodiment of the present invention may be formed of any hot melt resin having a melting point of about 150° C. to about 250° C., e.g., epoxy resin. The molding resin 240 may flow through the upper and lower locking holes 224a and 228a of the outer case 220, such that the outer case 220 may be molded to the polymer battery 210 enclosed therein.

The electrode terminals 231 of the polymer battery pack 200 according to an embodiment of the present invention may be molded with the resin 240 and may be exposed to the exterior only through predetermined regions of the molding resin 240 and the outer case 220. The electrode terminals 231 may be included in a protection circuit board 230 electrically connected to the polymer battery 210 via the electrode tap 211 and a lead 232. Alternatively, the protection circuit board 230 may be embedded by the mold without the electrode terminals 231.

The polymer battery pack 200 according to an embodiment of the present invention may further include an insulator (not shown) mounted between the electrode tap 211 of the polymer battery 210 and the protection circuit board 230.

Figure 10A:
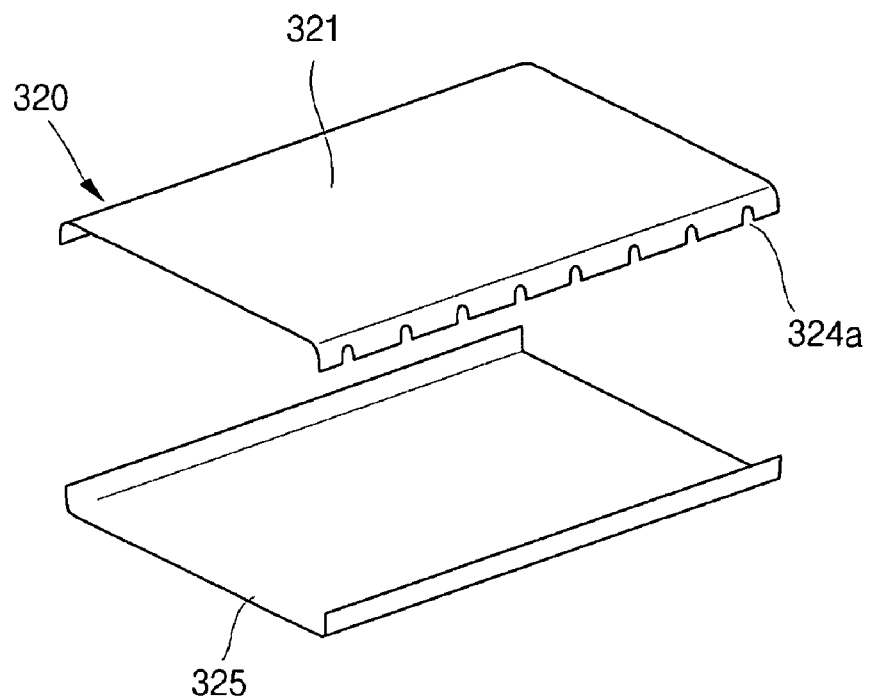
FIGS. 10A-10C illustrate perspective views of other embodiments of outer cases of the polymer battery pack illustrated in FIG. 8.
Figure 10B:
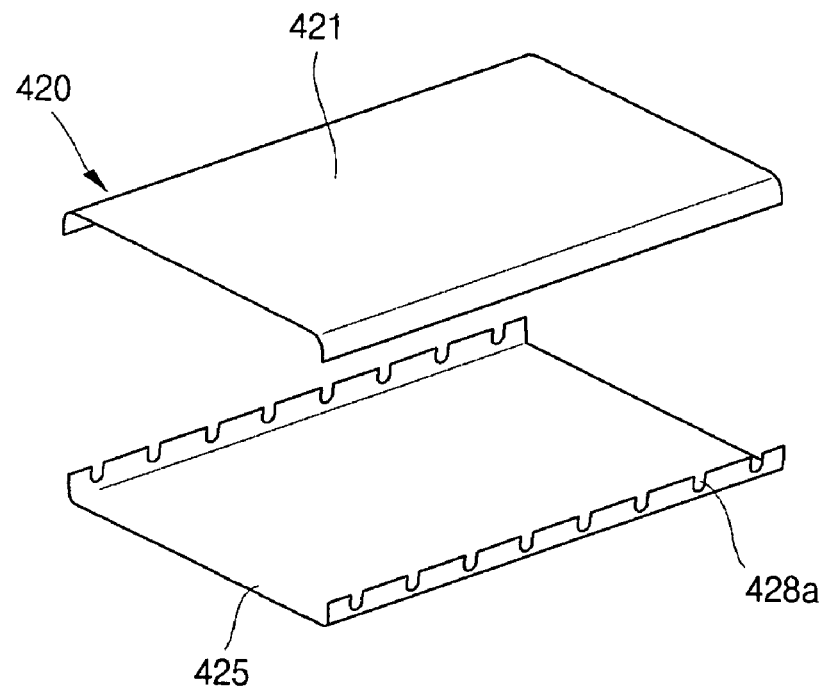
Figure 10C:
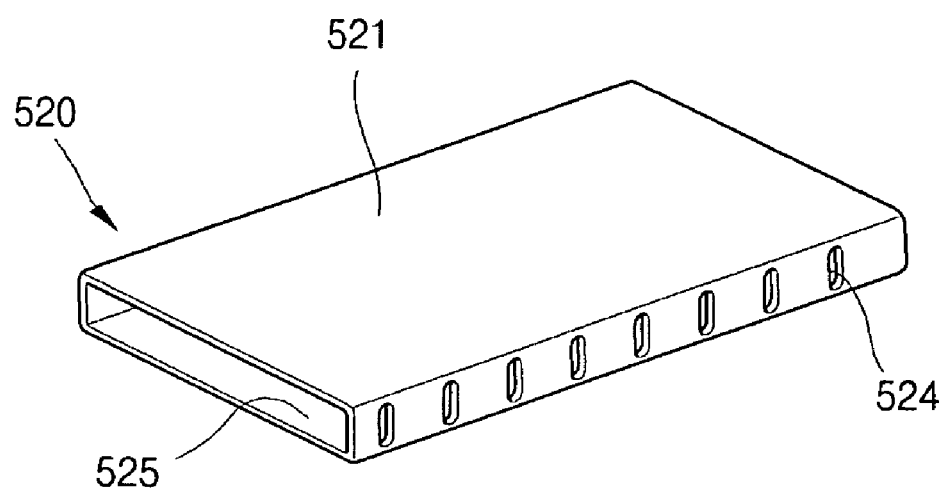

Alternatively, as illustrated in FIGS. 10A-10C, the polymer battery pack 200 may include an outer case 320, an outer case 420, or an outer case 520, instead of the outer case 220 described previously with respect to FIGS. 8-9.

The outer case 320, as illustrated in FIG. 10A, may include a first outer panel 321, a second outer panel 325, and upper locking holes 324a formed through the first outer panel 321. In other words, no holes may be formed through the second outer panel 325. Accordingly, a molding resin (not shown) may be formed between the first outer panel 321 and the polymer battery (not shown).

The outer case 420, as illustrated in FIG. 10B, may include a first outer panel 421, a second outer panel 425, and lower locking holes 428a formed through the second outer panel 425. In other words, no holes may be formed through the first outer panel 421. Accordingly, a molding resin (not shown) may be formed between the second outer panel 425 and the polymer battery (not shown).

The outer case 520, as illustrated in FIG. 10C, may include a first outer panel 521, a second outer panel 525, and central locking holes 524 formed in a boundary region between the first and second outer panels 521 and 525, such that the outer case 520 may be shaped as a flattened tube. Accordingly, a molding resin (not shown) may flow through the central locking holes 524 to form a mold layer in a boundary between the first and second outer panels 521 and 525 around the polymer battery (not shown).

The outer cases according to exemplary embodiments of the present invention, i.e., outer cases 120, 220, 320, 420, 520 and 1200, may be formed at a thickness of about 0.05 mm to about 0.15 mm. A thickness below about 0.05 mm may minimize the strength and durability of the polymer battery pack, while a thickness above about 0.15 mm may generate an excessively heavy polymer battery pack.

As described above, a polymer battery pack constructed according to embodiments of the present invention may provide enhanced strength, safety and reliability upon potential bending, twisting or drop thereof.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A polymer battery pack, comprising:
   a polymer battery;
   an outer case having a first outer panel and a second outer panel, the outer case enclosing the polymer battery, and at least one of the first and second outer panels including at least one surface having a plurality of locking holes extending through the surface;
   an electrode tap in electrical communication with the polymer battery and positioned outside the outer case; and
   a protecting circuit board in electrical communication with the electrode tap and positioned outside the outer case.

2. A polymer battery pack as claimed in claim 1, wherein the outer case includes a rear connecting plate in communication with the first and second outer panels.

3. A polymer battery pack as claimed in claim 2, wherein the rear connecting plate is capable of bending to a predetermined angle, relative to at least one of the first and second outer panels, to form an opening between the first and second outer panels.

4. A polymer battery pack as claimed in claim 1, wherein:
the first and second outer panels overlap respective top and bottom surfaces of the polymer battery, and
the at least one surface having a plurality of locking holes overlaps a side surface of the polymer battery.

5. A polymer battery pack as claimed in claim 1, wherein the first outer panel includes an upper portion coupled to an upper-peripheral portion, and the second outer panel includes a lower portion coupled to a lower-peripheral portion.

6. A polymer battery pack as claimed in claim 5, wherein the upper-peripheral portion includes an upper horizontal surface and an upper perpendicular surface, the upper horizontal surface positioned lower with respect to the upper portion, and the lower-peripheral portion includes a first lower horizontal surface, a second lower horizontal surface, a first lower perpendicular surface, and a second lower perpendicular surface, and the second lower horizontal surface of the second outer panel is coupled to the upper perpendicular surface of the first outer panel.

7. A polymer battery pack as claimed in claim 6, wherein the upper perpendicular surface of the first outer panel is positioned on a same plane as the first lower perpendicular surface of the second outer panel.

8. A polymer battery pack as claimed in claim 7, wherein the upper-peripheral and lower-peripheral portions are coupled to each peripheral side of the upper and lower portions, respectively.

9. A polymer battery pack as claimed in claim 7, wherein the upper-peripheral and lower-peripheral portions are coupled to each peripheral side and a rear side of the upper and lower portions, respectively.

10. A polymer battery pack as claimed in claim 1, wherein the first outer panel has a curved surface and a front perpendicular surface connected to the curved surface including a plurality of lower locking holes, and the second outer panel has a front horizontal surface including a plurality of upper locking holes.

11. A polymer battery pack as claimed in claim 1, wherein the outer case includes steel, stainless steel, aluminum, copper, metal alloy or plastic resin.

12. A polymer battery pack as claimed in claim 1, wherein the first and second outer panels include a plurality of upper and lower locking holes, respectively.

13. A polymer battery pack as claimed in claim 12, wherein the plurality of upper and lower locking holes are in communication with the electrode tap.

14. A polymer battery pack as claimed in claim 13, wherein the protection circuit is positioned in parallel to the upper and lower locking holes.

15. A polymer battery pack as claimed in claim 1, further comprising a molding resin.

16. A polymer battery pack as claimed in claim 15, wherein the molding resin includes at least one opening in communication with the outer case, a plurality of holes, and a damping paper in communication with the plurality of holes.

17. A polymer battery pack as claimed in claim 16, wherein the at least one opening of the molding resin is electrically connected to a electrode terminal of the protection circuit board.

18. A polymer battery pack as claimed in claim 6, further comprising two parallel covers, each cover coupled to the outer case.

19. A polymer battery pack as claimed in claim 18, wherein each cover is coupled to the upper horizontal surface of the first outer panel and to the first lower horizontal surface of the second outer panel via a perpendicular body.

20. A polymer battery pack as claimed in claim 18, wherein each cover further includes an upper longitudinal member coupled to the upper horizontal surface of the first outer panel and a lower longitudinal member coupled to the first lower horizontal surface of the second outer panel.

21. A polymer battery pack as claimed in claim 20, wherein the upper longitudinal member is positioned on a same plane as the upper portion of the first outer panel, and the lower longitudinal member is positioned on a same plane as the lower portion of the second outer panel.

22. A polymer battery pack as claimed in claim 15, further comprising an insulator between the electrode tap and the outer case.

23. A polymer battery pack as claimed in claim 22, wherein the insulator is in communication with the protection circuit board via the molding resin.

24. A polymer battery pack as claimed in claim 1, wherein the protection circuit board includes at least one electrode lead coupled to the electrode tap.

25. A polymer battery pack as claimed in claim 24, wherein the protection circuit board further comprises an insulating member between the at least one electrode lead and the electrode tap.

26. A polymer battery pack as claimed in claim 1, further comprising a label on a surface of the outer case.

27. A polymer battery pack as claimed in claim 26, wherein the label is in communication with the first outer panel and the second outer panel.

28. A polymer battery pack as claimed in claim 1, wherein the polymer battery includes a pouch, an insulator layer having a metal foil, an electrolysis liquid, and an electrode assembly in communication with the electrode tap.

29. A polymer battery pack as claimed in claim 5, further comprising an insulating surface in contact with the upper portion, the lower portion, and at least one side surface of the outer case.

30. A polymer battery pack as claimed in claim 29, wherein the insulating surface is an adhesive surface.

31. A polymer battery pack as claimed in claim 18, further comprising an insulator member between each cover and the outer case.

32. A polymer battery pack as claimed in claim 31, wherein the insulator member is an adhesive tape.

33. A polymer battery pack, comprising;
a polymer battery;
an outer case having a first outer panel and a second outer panel, the outer case enclosing the polymer battery, and at least one of the first and second outer panels including at least one surface having a plurality of locking holes extending through the surface;
an electrode tap in electrical communication with the polymer battery and positioned outside the outer case;
a protection circuit board in electrical communication with the electrode tap and positioned outside the outer case; and
a molding resin surrounding the outer case.

34. A polymer battery pack as claimed in claim 33, wherein the first and second outer panels include a plurality of upper and lower locking holes, respectively.

35. A polymer battery pack as claimed in claim 33, further comprising at least one upper locking hole through the first outer panel.

36. A polymer battery pack as claimed in claim 33, further comprising at least one lower locking hole through the second outer panel.

37. A polymer battery pack as claimed in claim 33, further comprising at least one central locking hole through a boundary between the first and second outer panels.

38. A polymer battery pack as claimed in claim 24, claim 34, wherein the lower and upper locking hole correspond to one another to form elliptical shapes.

39. A polymer battery pack as claimed in claim 33, wherein the outer case has an open tube shape.

* * * * *